Nov. 26, 1968
L. LUFT
3,413,484
CLOSED-LOOP CONTROL APPARATUS
Filed Jan. 28, 1965
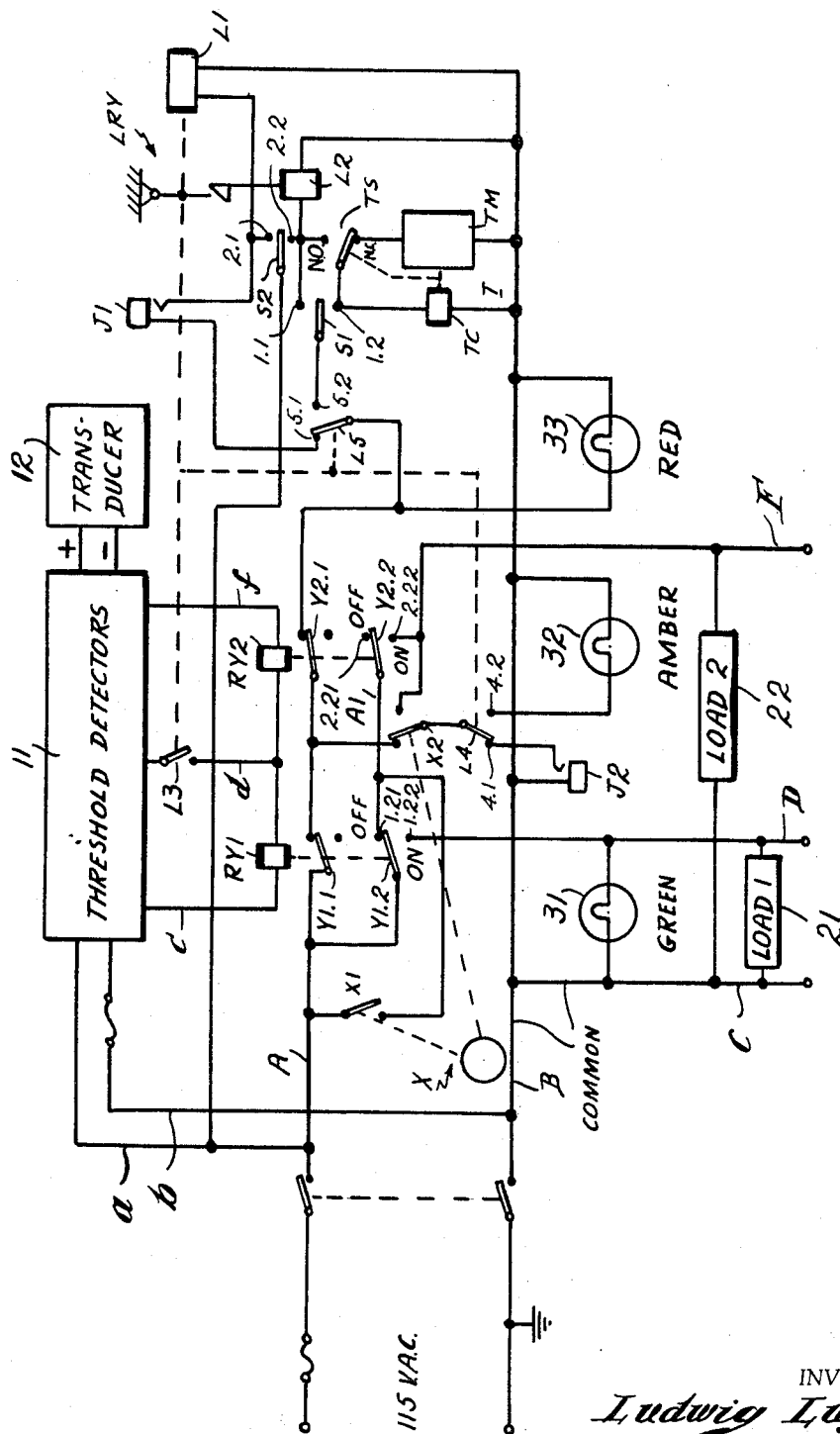
INVENTOR.
Ludwig Luft
BY
Roberts, Cushman & Grover,
ATT'YS.

United States Patent Office 3,413,484
Patented Nov. 26, 1968

3,413,484
CLOSED-LOOP CONTROL APPARATUS
Ludwig Luft, Lincoln, Mass. (% Luft Instruments,
P.O. Box 411a, South Lincoln, Mass. 01773)
Filed Jan. 28, 1965, Ser. No. 428,624
7 Claims. (Cl. 307—38)

ABSTRACT OF THE DISCLOSURE

An electrical control apparatus establishes a desired condition or state of a simple or combined variable characteristic of a controlled system or process. The apparatus is basically a digital logic circuit with manually and electrically operated on-off switches. It accepts the output of threshold detectors responsive to respective system variables, and has as output two power lines leading to control loads, permitting bidirectional action or unidirectional action on two levels. A control termination arrangement with variable time delay assures steady-state conditions on completion of batch operation. Auxiliary lines become activated on termination, permitting automatic sequencing control by activation of peripheral devices and remote command to resume control action.

---

The field of the present invention relates to electrical apparatus capable of performing control functions, more particularly, in systems operating on a "closed-loop" basis.

Closed-loop systems generally consist of a transducer or sensor which is being acted upon by the process parameter to be controlled, a final control element capable of acting on the process, and a controller which receives the output of the transducer and whose output activates the final control element; this controller completes the control loop. The present invention relates to such loop-closing control apparatus. Closed-loop systems are widely used in applications such as temperature control, pH control, weighing to predetermined value, automatic inspection and gauging, and many others. One way of classifying electric controllers, apart from the specific purpose, is by the output signal in relation to the deviation of the value of the controlled variable from the desired value. Thus, for an ON-OFF controller, the output signal may be ON when the variable is above the set point, and OFF when the variable is below the set point, or vice-versa. The relative position is established by a variety of possible circuits called threshold detectors. An ON-OFF controller operating with a single threshold detector tends to produce significant fluctuations in the value of the variable, due to the phenomenon called "overshooting," inherent in the dynamic response of most systems. This is caused, in part, by the fact that the system is subject to full ON conditions of the final control element till the threshold is actually crossed; capacity and inertia factors cause the so-called "coasting" effect which causes the "overshooting." As compared to ON-OFF controllers, PROPORTIONAL controllers, of which there are many kinds, are less subject to "overshooting" since their output is graduated. That is, the magnitude of the output is continuously related to the magnitude of the deviation of the controlled variable from the desired value. With a proper final control element, a proportional controller provides a graduated action on the process, depending on the magnitude of the deviation. Proportional controllers tend to be more expensive than the ON-OFF types, and are subject to other limitations.

Generally speaking, control problems may involve continuous processes such as, for example, most of paper making, or batch processes such as filling containers to a preset weight. While continuous control and batch control have certain features in common, such as detection of deviation from a desired value of the variable, the batch control often consists of a sequence of discrete actions, and is thus more difficult to master.

Objects of the present invention are to provide control apparatus capable of handling significant electric load which, when activated by two or more threshold detectors, delivers power to a corresponding number of outlets each outlet activating as its load the final control element in different degree thus permitting a graduated response to the deviation of the controlled variable; to provide a circuit in which the input signal or signals are isolated from the control load powder output signal or signals; to provide a circuit incorporating several control signals such as lights which serve in setting the control values and which indicate the state or mode of the controller in operation; to provide a circuit incorporating provision for time-adjustable control termination, with a selector switch permitting choice between batch and continuous process control; to provide a circuit in which an auxiliary output is activated in the control-terminated state, and which is useful in activating peripheral equipment such as printers or conveyors; to provide a circuit in which another auxiliary circuit can be activated, in the control terminated state, to cause the resumption of control; to provide a circuit which permits either interlocked or independent operation of the control power outputs; and to provide apparatus of this type which is simple, rugged, easy to install and to operate, which is very versatile and easily adaptable to diverse applications, and which is optimally reliable.

A summary briefly indicating the nature and substance of the invention in some of its principal aspects is as follows.

Control apparatus circuits according to the invention consist essentially of a number of manually and electrically operated switching means logically interconnected to control the propagation of electrical current along one line of a two-line supply which serves as the power input to the circuit. The control input means consist of one or more outputs of threshold detecting circuits (not part of this invention) which energize power diverting means such as relays. The general arrangement of the logic switching means is in series connection with provision for by-passes, constituting a type of hierarchic logic.

A preferred embodiment of the invention has two diverting relay means followed by a control termination circuit with a time-delay device and a bistable (such as latching) device with an operate actuator and a release actuator; switching and display elements are added to perform the required control functions. When the first power diverting relay (first in relation to input) in activated, power is diverted to an external load and the second diverting relay is deprived of power for example by virtue of double-throw relay contacts used in the diverting relays. Since the second relay now has no power to divert, its state has no control significance. This is a key factor in achieving separate regions of control, which makes possible the stepwise graduated control response. With the first power diverting relay inactivated, the second diverting relay can divert power to its load. With both diverting relays inactivated, power is transferred, depending on the choice of operating mode made by the time-delay device, to the release actuator of the bistable device, causing the opening of the three circuits and thus the termination of control. Control can be restored by momentary energization of the operate actuator of the bistable device.

These and other objects and novel aspects of the invention will appear from the herein presented outline of its principle and mode of operation together with a detailed description of a practical embodiment illustrating its novel characteristics.

The description refers to a drawing in which a preferred embodiment of the invention is shown, and wherein the position of the switches corresponds to the interlocked relay mode of operation in the control terminated state, as will be explained hereinbelow.

The electrical and mechanical connections of the circuit components are clearly shown in the drawing which is to that extent self-explanatory. The appropriate structural characteristics, values, ratings or commercially accepted designations for each of the components are given in the following list which refers to the numerals of the drawing. It will be understood that the specific values and ratings given are subject to adjustments applied upon initial and performance testing, according to routine practice in the manufacture of devices of this type. It will be further understood that the values as well as types of the various components are those of a practical embodiment so that deviations therefrom and possible variants are to be expected for other embodiments still within the general scope of the invention.

List of components:

RY1 and RY2: Diverting relays, telephone type with 2PDT power contacts, 150 ohm D.C. coil. Automatic Electric EIN(EQA). RY1 uses a single throw switch Y1.1 and, coupled thereto, a double throw switch Y1.2 with alternately closed diverting contact 1.21 and load supply contact 1.22. RY2 uses a single throw switch Y2.1 and a double throw switch Y2.2 with contacts 2.21 and 2.22.

LRY: Latching relay, magnetic, telephone type, with 3PDT contacts; Automatic Electric EIN(ERM). Operate and release coils L1 and L2, respectively; switches L3, L4, L5.

T: Time delay relay, 0–60 seconds, running with 115 v. AC power on, resetting on power interruption. Essex Engineering Company. With motor TM, clutch TC and double throw switch TS.

X: 6P3T rotary switch. Mallory 1323L. Contacts X1, X2, alternately open and closed.

S1: 3-position toggle, center off, maintained. Double throw with contacts S1.1, S1.2.

S2: 3-position toggle, center off, momentary. Double throw with contacts S2.1, S2.2.

31, 32, 32: Indicator lights, full voltage 6S6 bulbs held in General Electric Company CR–103 lamps.

J1, J2: Conventional telephone jacks.

The circuit represented in the drawing consists, as mentioned above, essentially of a system of interconnected switches which are manually or electrically operated. In general, the switches are connected in series with appropriate by-passes, the switching being performed on one and the same line, here A, of a two-line power transmission system A, B. It is line A which is further discussed herein; the switched current is passed to load lines or terminals D, F and returned to the other line B through the load or loads 21, 22, through the indicating lights 31, 32, 33, or through the control termination part of the circuit, or through both. A1 is a by-pass or energy diverting line.

The circuit of this embodiment has two power diverting relays, RY1, RY2 connected to the detector output lines $c$, $d$, and to return output line $f$. It can be operated in two modes:

Mode I, as shown in the drawing, in which the contacts Y1.1, Y1.2, Y2.1 and Y2.2 of the diverting relays are in series, and Mode II in which the diverting relays can handle power independently of one another. Switching between Mode I and Mode II is accomplished by manually operated switch X, transferring its contacts X1 and X2. Threshold detectors 11 are supplied with appropriate signals from the transducer apparatus 12 that is responsive to that variable or parameter of the controlled system or process and which is to effect the desired regulation such as temperature, chemical or optical characteristic, weight, liquid level, viscosity. Both detector and transducer apparatus can be of any conventional design. The control power output or load devices 21, 22 are likewise of conventional design appropriate to the nature of the system at hand, such as pumps, burettes, coulometric generators, variable impedance devices.

Leads $a$, $b$ indicate an appropriate power supply to the threshold detectors 11.

In the drawing, both relays RY1 and RY2 are shown in deenergized or "OFF" position as indicated at their contacts. This condition is present in the "operation completed" state.

Mode I is used in a control situation when the power outputs are to be operated in sequence as the controlled variable passes the set points. For example, in a temperature control situation one set point establishes the desired temperature level, while the other establishes a temperature level at which the heat input rate is switched from a high to a low value. This permits a high heating rate at temperatures remote from the desired value and a low heating rate in a band near the desired value. The stepwise gradation of the heat input reduces the amount of overshoot when the temperature rise activates the threshold detector set for the desired temperature.

Mode II of the control is used when the set points are used to define the upper and the lower limits, respectively, of a control band. In this mode, there is generally no power output to loads as long as the variable is within the control band, the outputs appearing as the process variable crosses either of the set points. In Mode II the power outputs are generally used to operate one device capable of bidirectional operation (such as a reversing motor) or two devices (such as valves), each of these two devices causing an action to restore the variable to the control band. In some applications, the Mode II control can be used to produce power output on both outputs while the variable is in the control band, by having the high and low set points overlap.

It will now be evident that, as indicated above, the series connected first switches of the first and second relays, respectively, constitute an internal logic circuit, whereas the second switches of the said first and second relays, respectively, control the power supplied to one or more external loads, as determined by the preset logic circuitry.

The operation of the circuit in Mode I that is shown in the drawing, is as follows:

The power line A connects to both transfer contacts Y1.1, Y1.2 of RY1. The contact L3 of the latching relay LRY is closed when the circuit is in "controlling" state, thus permitting the activation of the coils of both power diverting relays RY1, RY2 by the appropriate threshold detectors 11. When the RY1 coil is activated, 21 the "LOAD 1," receives power through 1.22 and D, and the GREEN light 31 which is in parallel with the load lights up. It should be noted that this helps to suppress sparks on RY1 contacts when load 21 is inductive in nature. When RY1 is "ON," the transfer contacts Y2.1, Y2.2 of the other diverting relay RY2 have no power, since they are connected to the "normally OFF" contacts of RY1. Thus, there can be no power output from RY2 even, as is normally the case, when RY2 is activated along with RY1. When RY1 is "OFF" the transfer contacts of RY2 receive power and, with contact L4 of LRY completing the AMBER light circuit, the AMBER light is "ON." When the RY2 coil is activated power is transferred to 22, the "LOAD 2." With RY2 "OFF," power appears on the terminal of RED light which goes "ON," and power also appears on the transfer contact of switch L5 of LRY, which completes the circuit to the transfer contact of switch S1 that is a part of the control termination circuit. When switch S1 is in its center "OFF" position, the termination circuit is disconnected and the circuit will not terminate control. This position provides "infinite" delay, corresponding to requirements of control of continuous processes. When switch S1 is in the upper position, a direct connection is established with the release coil L2 of LRY; as soon as the RED light goes "ON," this coil is activated and LRY terminates control. In the lower position S1 connects to the LRY release coil L2 through the time-delay relay T. In this position. when RED light goes "ON" the timer motor TM and the solenoid clutch TC of the time delay relay become activated. An interruption of power to the time delay relay causes the unit to reset. In due course, after activation (depending on the preset delay value), the timer motor TM causes the switch TS to transfer from the normally closed "NC" to the normally open "NO" position. This stops the timer motor and transfers power to the release coil L2 of LRY. This coil is activated, and LRY terminates control by transferring contacts L3, L4, L5. Control termination is, of course, a necessary feature for the control of batch processes. Control can also be terminated manually at any time by operating switch S2 down, which activates the release coil L2 of LRY through a line which by-passes all of the circuit thus far described. S2 is also used for manual "start," by using the upper contact to activate the operate coil L1 of LRY, which puts the circuit into "controlling" state.

The three switches L3, L4, L5 of the LRY relay do the following on control termination: L3 in the return line $d$ opens the coil circuits of RY1 and RY2. This keeps them in the "OFF" position without affecting the operation of the threshold detectors; L4 transfers power from the AMBER light circuit to the jack J2. This puts the AMBER light out, and activates the circuit of jack J2 which can be used to activate or operate peripheral equipment; L5 opens the circuit to the S1 switch and closes the circuit of the jack J1. This causes the clutch TC of the time-delay relay to reset, and provides a by-pass for activation of the operate coil L1 of LRY3 by means of a switch closure on remote peripheral equipment. Both J1 and J2 connections are most important for automation of batch processes, since they permit start of external sequences and automatic resumption of control.

The colored lights provide an indication of the control stage of the circuit: "GREEN—LOAD 1" indicates "ON"; "AMBER—LOAD 2" indicates "ON"; "AMBER and RED" indicates that both loads are "OFF," but the circuit is active; "RED" indicates "control-terminated." This holds true only for Mode I operation.

In Mode II, the operation is similar, but X1 permits the by-passing of RY1, and X2 puts the light "AMBER" in parallel with "LOAD 2." In Mode II operation, then, "RED" indicates condition "within the control band"; "AMBER" indicates "above the upper limit"; "GREEN" indicates "below the lower limit."

While the circuit as described above by way of example represents a preferred embodiment, it will be understood that the invention embraces other embodiments which may involve various features such as the following: One or several diverting relays may be used; operation with threshold detectors operating on more than one variable, but feeding into the same control circuit can be incorporated; diverting relays with a different number and arrangement of contracts may be used; a different latching relay (including single coil relays) with a different number and type of contacts, some of which used to perform additional control functions, may be suitable for some purposes; a varity of selectable by-passes around diverting relays and other circuit elements can be incorporated.

It should be understood that the present disclosure is for the purpose of illustration only and that this invention includes all modifications and equivalents which fall within the scope of the appended claims.

I claim:
1. Apparatus for supervising a system to be controlled, comprising:
   threshold detector means associated with said system and having a plurality of output lines;
   an energy source with a supply line and a common return line;
   a plurality of control load devices associated with said system and each having a control terminal and a connection to said return line;
   an energy diverting line for leading from a branch point of said energy supply line to one of said load control terminals; and
   first and second diverting relays each having an actuator, a first switch, and a second switch, the actuators being connected to said threshold detector output lines for making output of said detector means available to either one or another of said control load devices or—for operation in a limiting mode— to both control load devices, the first switch of the first relay and the first switch of the second relay being connected in series in said supply line behind said branch point of the diverting line, said first switches being part of a logic circuit while said second switches are part of a plurality of circuits for supplying said load devices, the second switch of the first relay having two contacts one for selectively connecting said branch point to one control terminal and a second contact in the diverting line alternatively leading to the second control terminal, and the second switch of the second relay having a contact in the diverting line for connecting it to said second control terminal; said switches selectively connecting, depending on the energization of said actuators by said detector means, one or the other of said control devices to the supply line of the energy source.

2. Apparatus according to claim 1 further comprising a control termination circuit which includes:
   a bistable device having operate means and release means both energizable from said energy supply line, and latched switch means for energizing the release means;
   a time delay device for energizing said release means;
   a first termination switch for selectively making connection between said supply line and alternately said delay device and said release means; and
   a second termination switch for selectively making connection between said supply line and alternately said operate means and said release means of the bistable device.

3. Apparatus according to claim 2 further comprising:
   a first signal means connected to said second contact of the first relay;
   a second signal means;
   latched switch means operable by said bistable device for connecting said second signal means to said energy supply line; and
   a third signal means connected to said first switch of the second relay.

4. Apparatus according to claim 2 further comprising a connection from a third output of the detector means to the connection between said two diverting relays, and in said connection a latched switch means operable by said bistable device.

5. Apparatus according to claim 2 further comprising jack means connected on one side to said operate means of the bistable device for energization by said second termination switch together with energization of said operate means and connected on the other side to said latched switch means for energizing the release means.

6. Apparatus according to claim 2 further comprising jack means connected to said energy supply line through latched switch means operable by said bistable device.

7. Apparatus according to claim 1 further comprising a shunt around said second switch of said first diverting relay and containing a switch for interrupting said shunt in order to bypass said second switch of said first relay without affecting said series connection of said first switches of said first and second relays, respectively.

References Cited

UNITED STATES PATENTS

| 3,201,615 | 8/1965 | Jackson | 307—116 |
| 3,218,486 | 11/1965 | Meister | 307—116 |
| 3,223,590 | 12/1965 | Troeger | 307—116 X |
| 3,271,580 | 9/1966 | Pope | 307—34 X |

ORIS L. RADER, *Primary Examiner.*

W. E. DUNCANSON, *Assistant Examiner.*